March 27, 1934.  J. S. WALLIS ET AL  1,952,225
METHOD OF RERUNNING PRESSURE DISTILLATE
Filed Sept. 29, 1932
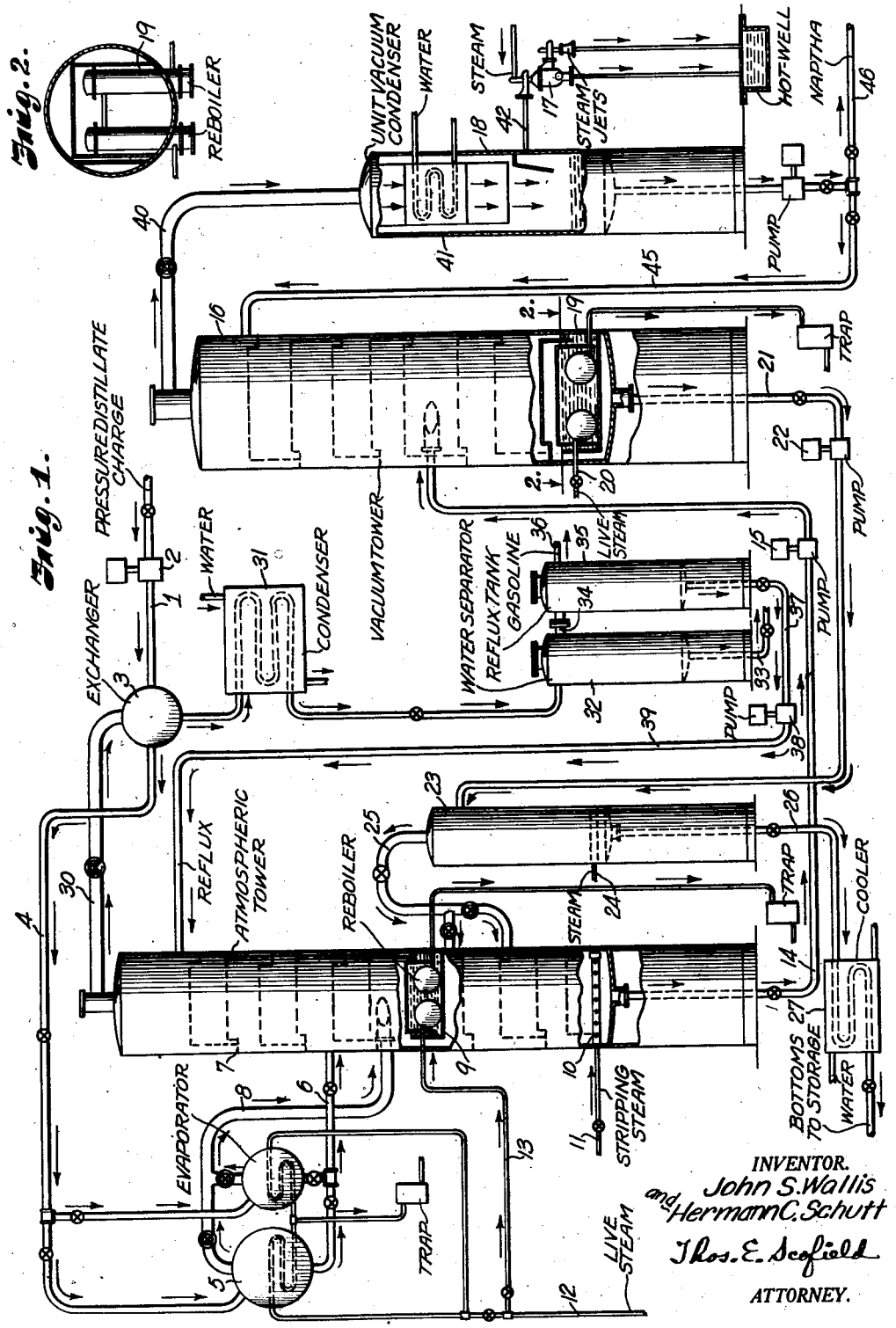
INVENTOR.
John S. Wallis
and Hermann C. Schutt
Thos. E. Scofield
ATTORNEY.

Patented Mar. 27, 1934

1,952,225

UNITED STATES PATENT OFFICE 1,952,225

METHOD OF RERUNNING PRESSURE DISTILLATE

John S. Wallis, New York, and Hermann C. Schutt, Mount Vernon, N. Y., assignors to Alco Products Incorporated, New York, N. Y., a corporation of Delaware Application September 29, 1932, Serial No. 635,350

3 Claims. (Cl. 196—95)

Our invention relates to a method of rerunning pressure distillate, and more particularly to a two-stage, atmospheric and vacuum operation.

It has been known to process pressure distillate at a limiting temperature in a two-stage, atmospheric and vacuum unit. The question has always arisen in an operation of this character whether the vacuum stage shall be wet or dry. By wet we mean a vacuum stage in which open steam is used to strip the bottoms therein. By dry we mean a stage in which no open steam is used. If the vacuum stage is operated as a dry vacuum, it is possible to obtain a lower absolute pressure and lower steam consumption, inasmuch as no open steam is used for stripping. It is necessary, however, when no open steam is used, to obtain a very high recirculation rate or a high degree of internal reboiling in order to effect the necessary separation. If stripping steam is used in the vacuum stage, that is in a wet vacuum process, the vacuum is limited by the vapor pressure of the water and the relatively high quantity of exhaust steam which are necessary to obtain the same vapor pressure at the point of flash, as compared with dry vacuum. When open steam is used, the bottoms are stripped in a satisfactory manner but necessarily, it will be understood, large quantities of steam are used not only for stripping, but on the vacuum jets in order to maintain the reduced pressure.

In an operation of the kind mentioned above, the atmospheric stage inherently requires a large quantity of exhaust steam in order to obtain a lower vapor pressure at the point of flash, and to strip the bottoms leaving the atmospheric stage to a sufficiently high initial boiling point. This is necessary so that the overhead stream on the vacuum stage may be condensed to a normal temperature of cooling water.

One object of our invention is to provide a two-stage (atmospheric and vacuum) operation which will reduce the steam consumption by enabling the steam jets to maintain a vacuum more expeditiously.

Another object of our invention is to provide a process of rerunning pressure distillate in which the bottoms are stripped to final specifications without a high degree of reboiling.

Other objects of our invention will appear from the following description.

Figure 1 is a diagrammatic view of one apparatus capable of carrying out the process of our invention.

Figure 2 is a diagrammatic sectional view taken on the line 2—2, Fig. 1.

In general, our invention contemplates a two-stage process in which the vacuum stage is dry. The pressure distillate is heated to vaporizing temperature by any suitable means, and flashed to the atmospheric tower in which the usual stripping steam is used. The bottoms from the atmospheric stage are pumped to the vacuum stage which is maintained under reduced pressure by means of the usual steam jets.

The bottom from the vacuum stage is pumped to an external stripping section, in which the lighter constituents are distilled off by the use of open steam. The oil vapors and stripping steam are introduced to the atmospheric stage tower to reduce the partial pressure therein. This will reduce the quantity of stripping steam necessary in this tower. The head product from the atmospheric stage is cooled and passed to a separator where aviation gasoline is withdrawn. Part of the heavier fractions separated in the separator are recycled to the atmospheric stage.

More particularly, referring now to the drawing, pressure distillate is pumped through line 1 by pump 2 through heat exchanger 3 through valved line 4 to evaporator 5. It is to be understood that any suitable evaporating means may be used. I have shown the heat exchanger type in which live steam is used as the heating medium. The unvaporized oil in the evaporators passes through line 6 to atmospheric tower 7 in which the dotted lines indicate fractionating decks or trays. The vaporized portions of the charge passing through vapor line 8 are introduced to the atmospheric tower. The atmospheric tower is provided with a reboiler 9 and a distributing member 10 for the introduction of stripping steam through line 11. Live steam from line 12 passes through line 13 to reboiler 9. The bottoms leave the atmospheric tower through valved line 14 and are pumped by pump 15 to the vacuum tower 16 in which the dotted lines indicate fractionating decks or trays. It is to be noted that no open steam is used in the vacuum tower. The vacuum is maintained by the use of steam jets 17 connected to unit condensers 18. The vacuum tower 16 is provided with a reboiler 19 which is fed by live steam entering through line 20.

The tail product of the vacuum tower leaves it through line 21 and is pumped by pump 22 to external stripping section 23, which is fed with stripping steam through line 24. Here the bottoms of the vacuum stage are stripped of their lighter constituents. The head products, which will include oil vapors and steam, leave the stripping section through line 25 and are reintroduced into the atmospheric stage, as can be readily seen by reference to the accompanying drawing. The stripped fractions which constitute the bottoms of the stripping section are withdrawn therefrom through line 26 and pass through cooler 27 to storage. The head product from the atmospheric stage is withdrawn through line 30 and is passed through heat exchanger 3 and cooler 31 to water separator 32. The water is withdrawn from the separator through line 33. The gasoline leaves the separator through line 34, and passes to reflux tank 35, from which gasoline is withdrawn through line 36. A part of the condensate is recycled through line 39, and reintroduced to the atmospheric tower. The head product of the vacuum stage is withdrawn therefrom through line 40 and is passed through condenser section 41, a part of the unit condenser 18, which is connected to the vacuum jets by line 42. A portion of the overhead product condensed and cooled in the unit vacuum condenser 18 is recycled through line 45 and reintroduced into the vacuum stage. The remainder of the condensate is pumped through line 46 to storage.

It will be apparent from the above description that due to the fact that we employ a dry vacuum stage, we are enabled to maintain the vacuum therein much more expeditiously than would be possible if stripping steam were used in the vacuum stage. We are thus enabled to reduce the consumption of live steam on the steam jets and maintain the vacuum.

In stripping the bottoms of the vacuum stage externally, we are enabled to pass the oil vapors and steam from the stripping stage to the atmospheric tower, thus reducing the partial pressure there existing. This will reduce the amount of stripping steam necessary in the atmospheric stage.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. The method of fractionating hydrocarbon oils in two stages of fractionation, one of which is maintained at a pressure lower than the other, including the steps of establishing a plurality of equilibrium zones in a first stage of fractionation at one pressure, contacting the tail fraction in said fractionating stage with steam to strip the lighter constituents from said fraction, withdrawing the tail fraction from said stage, fractionating the fraction so withdrawn in a second stage of fractionation in which no open steam is employed, maintaining said second stage at a pressure below that of said first stage, withdrawing the tail fraction from said second stage of fractionation, contacting the fraction so withdrawn with steam in an external stripping stage and introducing the evolved vapors and steam into said first stage of fractionation to reduce the partial pressure therein.

2. The method of fractionating hydrocarbon oils including the steps of fractionating a hydrocarbon oil in fractionating stage at atmospheric pressure, stripping the tail fraction therein with steam, withdrawing said fraction and fractionating the same in a fractionating stage maintained under a partial vacuum, withdrawing the tail fraction from said vacuum stage, stripping the fraction so withdrawn and introducing the vapors evolved in the stripping step into the atmospheric fractionating stage to reduce the partial pressure therein.

3. A fractionating process for hydrocarbon oils including the following steps; the fractionating of oil in an atmospheric stage of fractionation in the presence of open steam, the fractionation of the tail product of the atmospheric stage in a vacuum stage of fractionation in the absence of open steam, the stripping of the tail product of the vacuum stage in an external stripping stage and the introduction of the vapors evolved in the stripping stage into the atmospheric fractionating stage, whereby a vacuum is more easily maintained in the vacuum stage and the partial vapor pressure in the atmospheric stage is reduced.

JOHN S. WALLIS.
HERMANN C. SCHUTT.